(12) United States Patent
Lee

(10) Patent No.: US 11,517,847 B2
(45) Date of Patent: Dec. 6, 2022

(54) COBALT-CARBON GAS COLLECTION APPARATUS

(71) Applicant: J-SOLUTION CO., LTD., Yongin-si (KR)

(72) Inventor: Seungyong Lee, Hwaseong-si (KR)

(73) Assignee: J-SOLUTION CO., LTD., Yongin-si (KR)

( * ) Notice: Subject to any disclaimer, the term of this patent is extended or adjusted under 35 U.S.C. 154(b) by 170 days.

(21) Appl. No.: 17/139,237

(22) Filed: Dec. 31, 2020

(65) Prior Publication Data

US 2022/0203289 A1 Jun. 30, 2022

(51) Int. Cl.
| | | |
|---|---|---|
| *B01D 8/00* | (2006.01) | |
| *B01D 53/00* | (2006.01) | |
| *B01D 53/34* | (2006.01) | |
| *B01D 53/75* | (2006.01) | |
| *B01D 53/81* | (2006.01) | |

(52) U.S. Cl.
CPC ............ *B01D 53/005* (2013.01); *B01D 8/00* (2013.01); *B01D 53/346* (2013.01); *B01D 53/75* (2013.01); *B01D 53/81* (2013.01); *B01D 2257/10* (2013.01); *B01D 2258/0216* (2013.01)

(58) Field of Classification Search
CPC ...... B01D 53/005; B01D 53/75; B01D 53/81; B01D 53/346; B01D 8/00; B01D 2257/10; B01D 2258/0216
See application file for complete search history.

(56) References Cited

FOREIGN PATENT DOCUMENTS

| KR | 100267171 B1 * | 10/2000 | ............ B01D 53/02 |
|---|---|---|---|
| KR | 10-0862684 B1 | 10/2008 | |
| KR | 102311930 B1 * | 10/2021 | ........... B01D 53/005 |

* cited by examiner

*Primary Examiner* — Timothy C Vanoy
(74) *Attorney, Agent, or Firm* — Paratus Law Group, PLLC

(57) ABSTRACT

Disclosed is a gas collection apparatus used in manufacturing a semiconductor. The apparatus includes: a housing having a chamber formed therein; a heating member installed in the housing to heat cobalt-carbon gas introduced into the chamber; a cobalt deposition member installed across the chamber of the housing to deposit cobalt composite; and a cooling member that induces carbon composite to be solidified and deposited while rapidly cooling the carbon composite.

15 Claims, 6 Drawing Sheets

COBALT-CARBON GAS COLLECTION APPARATUS

BACKGROUND

The present disclosure relates to equipment for manufacturing a semiconductor or a product similar to a semiconductor, and more particularly, to a cobalt-carbon gas collection apparatus which may effectively collect a cobalt-carbon gas that is a by-product generated in a metal process.

In general, a semiconductor manufacturing process roughly includes a pre-process (fabrication process) and a post-process (assembly process), wherein the pre-process refers to a process in which thin films are deposited on wafers in various process chambers, the deposited films are selectively and repeatedly etched to process specific patterns, and thus so-called semiconductor chips are manufactured, and the post-process refers to a process in which the chips manufactured in the pre-process are individually separated and are then coupled to lead frames, and thus finished products are assembled.

In this case, the process of depositing the thin film on the wafer or etching the thin film deposited on the wafer is performed in the process chamber using harmful gases such as silane, arsine, and boron chloride and a process gas such as hydrogen at a high temperature, and during the process, a large amount of various flammable gases, corrosive foreign substances, harmful gases containing toxic components, and the like are generated in the process chamber.

Thus, in semiconductor manufacturing equipment, a scrubber that purifies exhaust gas discharged from the process chamber and then discharges the purified gas to the atmosphere is installed at a rear end of a vacuum pump that makes the process chamber into a vacuum state.

However, the exhaust gas discharged from the process chamber is solidified into powder when the exhaust gas comes into contact with the atmosphere or the ambient temperature is low, and the powder is fixed to an exhaust line to increase the exhaust pressure, and at the same time, when being introduced into the vacuum pump, causes a failure of the vacuum pump and a reverse flow of the exhaust gas to contaminate the wafer in the process chamber.

Accordingly, in order to solve the above problems, as illustrated in FIG. 1, a powder trapping device that adheres the exhaust gas discharged from the process chamber 10 in a powder state is installed between the process chamber 10 and a vacuum pump 30.

That is, as illustrated in FIG. 1, the process chamber 10 and the vacuum pump 30 are connected to a pumping line 60, and a trapping tube 70 for trapping and accumulating reaction by-products generated in the process chamber 10 in a powder form is branched off and installed from the pumping line 60.

In the case of such a powder trapping device according to the related art, unreacted gas generated during the deposition or etching of a thin film inside the process chamber 10 is solidified into a powder while being introduced into the pumping line 60 having a relatively low temperature atmosphere as compared to the process chamber 10. Thereafter, the powder is accumulated in the trapping tube 70 installed to be branched off from the pumping line 60.

In this case, the reason why the trapping tube 70 is branched off and installed from the pumping line 60 is to prevent the powder from being introduced into the vacuum pump 30. For reference, undescribed symbol "9" indicates the powder.

However, when an object to be collected is a cobalt-carbon gas generated in a metal process and when a reaction by-product powder trapping device according to the related art is used, collection efficiency is very degraded. This is because the cobalt-carbon gas includes a cobalt composite and a carbon composite, and even though the deposition conditions thereof are very different from each other, the cobalt composite and the carbon composite are directly deposited in the form of the cobalt-carbon gas.

RELATED ART

Patent Document

Korean Patent No. 10-0862684 (registered on: Oct. 2, 2008)

SUMMARY

Accordingly, the present disclosure has been proposed to solve the problems of the related art, and the purpose of the present disclosure is to provide a cobalt-carbon gas collection apparatus which may effectively collect a cobalt-carbon gas that is a by-product generated in a metal process.

A cobalt-carbon gas collection apparatus that collects a cobalt-carbon gas generated in a metal process performed when any one product included in a product group including a semiconductor product is manufactured according to an aspect of the present disclosure includes: a housing that has a chamber formed therein and an inlet port and an outlet port communicating with the chamber; a heating member that is installed in the housing, increases a temperature inside the chamber of the housing to heat the cobalt-carbon gas introduced into the chamber of the housing to a temperature higher than a temperature immediately after the introduction into the chamber, and induces the cobalt-carbon gas to be separated into a cobalt composite and a carbon composite; a cobalt deposition member that is installed across the chamber of the housing and oxidizes and deposits the cobalt composite while coming into surface contact with the cobalt composite while being heated by the heating member; and a cooling member that induces the carbon composite to be solidified and deposited while rapidly cooling the carbon composite in contact with the inner surface of the housing by cooling a wall part of the housing, wherein the inside of the chamber of the housing is heated by the heating member, the cobalt-carbon gas introduced into the chamber is separated into the cobalt composite and the carbon composite, and the cobalt composite and the carbon composite, which are separated, are individually deposited on the heated cobalt deposition member and the cooled inner surface of the housing.

The heating member may induce the carbon composite to be separated from the cobalt composite by heating cobalt-carbon gas particles having a structure in which the carbon composite surrounds the cobalt composite to a temperature at which the cobalt composite is heated and expanded, the cobalt deposition member may be heated to a temperature higher than the temperature inside the chamber of the housing in order to oxide and deposit the cobalt composite, and the inner surface of the housing may be cooled to a temperature sharply lower than the temperature of the cobalt-carbon gas immediately after the cobalt-carbon gas is introduced into the chamber of the housing in order to induce the solidification and deposition of the carbon composite.

The cobalt deposition member may be provided as a metal lath that is a plate having a mesh shape such that the cobalt composite and the carbon composite come into surface contact therewith while passing from the top to the bottom.

The cobalt deposition members may be provided as a plurality of auxiliary deposition members arranged adjacent to and vertically spaced apart from each other, the heating member may be installed between the plurality of cobalt deposition members, and thus the cobalt deposition members may be heated in the vicinity of the heating members.

The heater may include a line-type heater installed in a line shape along the cobalt deposition member, and heating contact fins installed in a wing shape along an outer circumferential surface of the line-type heater and configured to increase a heating contact area for the cobalt composite.

The heating contact fins may be successively wound and installed in a spiral shape along an outer peripheral surface of the line-type heater.

The cobalt-carbon gas collection apparatus may further include an auxiliary deposition member that is installed across the chamber of the housing at a point spaced apart from a lower side of the cobalt deposition member and oxidizes and deposits the cobalt composite, which passes through the cobalt deposition member without being deposited on the cobalt deposition member, while coming into surface contact with the cobalt composite, wherein the auxiliary deposition member is provided as a metal lath that is a plate having a mesh shape such that the cobalt composite and the carbon composite come into contact with the auxiliary deposition member while passing from the top to the bottom, and the auxiliary deposition member is provided as a plurality of auxiliary deposition members arranged adjacent to and spaced apart from each other, densely arranged at an interval narrower than an interval of the cobalt deposition members, and heated to a surface temperature lower than a surface temperature of the cobalt deposition member.

The plurality of cobalt deposition members and the plurality of auxiliary deposition members may be alternately installed in the chamber of the housing.

An outlet tube installed at the outlet port may suppress the cobalt composite and the carbon composite that are not deposited from flowing out from the chamber of the housing by causing an upper end of the outlet tube to protrude upward from the bottom of the chamber of the housing.

The wall part of the housing may be formed in a double wall structure having a separation space therein, and the cooling member may be a cooling water injection tube and a cooling water discharge tube that cause cooling water to circulate to the separation space of the wall part of the housing.

A plurality of first guide partitions and a plurality of second guide partitions, which are vertically formed, may be alternately installed in the separation space formed inside the wall part of the housing in a circumferential direction of the housing, the first guide partitions may be provided to be biased upward to allow the cooling water to flow downward, the second guide partitions may be provided to be biased downward to allow the cooling water to flow upward, and thus the cooling water may be guided to flow in the circumferential direction of the housing in a zigzag manner in the separation space inside the wall part of the housing.

The upper surface of the housing may be formed as an upper cover to be opened or closed, a cooling water circulation hole in which the cooling water is injected by the cooling water injection tube, circulates in a circumferential direction, and is then discharged along the cooling water discharge tube may be formed inside the upper cover, and thus the deposition of the carbon composite in contact with a lower surface of the upper cover may be induced.

A cobalt-carbon gas collection method that collects a cobalt-carbon gas generated in a metal process performed when any one product included in a product group including a semiconductor product is manufactured according to the present disclosure includes separating the cobalt-carbon gas, which is introduced into a chamber, into a cobalt composite and a carbon composite first by heating the inside of the sealed chamber, and individually depositing the cobalt composite and the carbon composite which are separated.

The cobalt composite surrounded by the carbon composite may be heated and expanded to separate the cobalt-carbon gas into the cobalt composite and the carbon composite in the chamber.

The separated cobalt composite may be oxidized and deposited by being in contact with a surface of a cobalt deposition member heated to a temperature higher than a temperature inside the chamber, and the separated carbon composite may be rapidly cooled to be solidified and deposited by being in contact with a surface of another member cooled to a temperature lower than a temperature of the cobalt-carbon gas introduced into the chamber.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Figure 1:
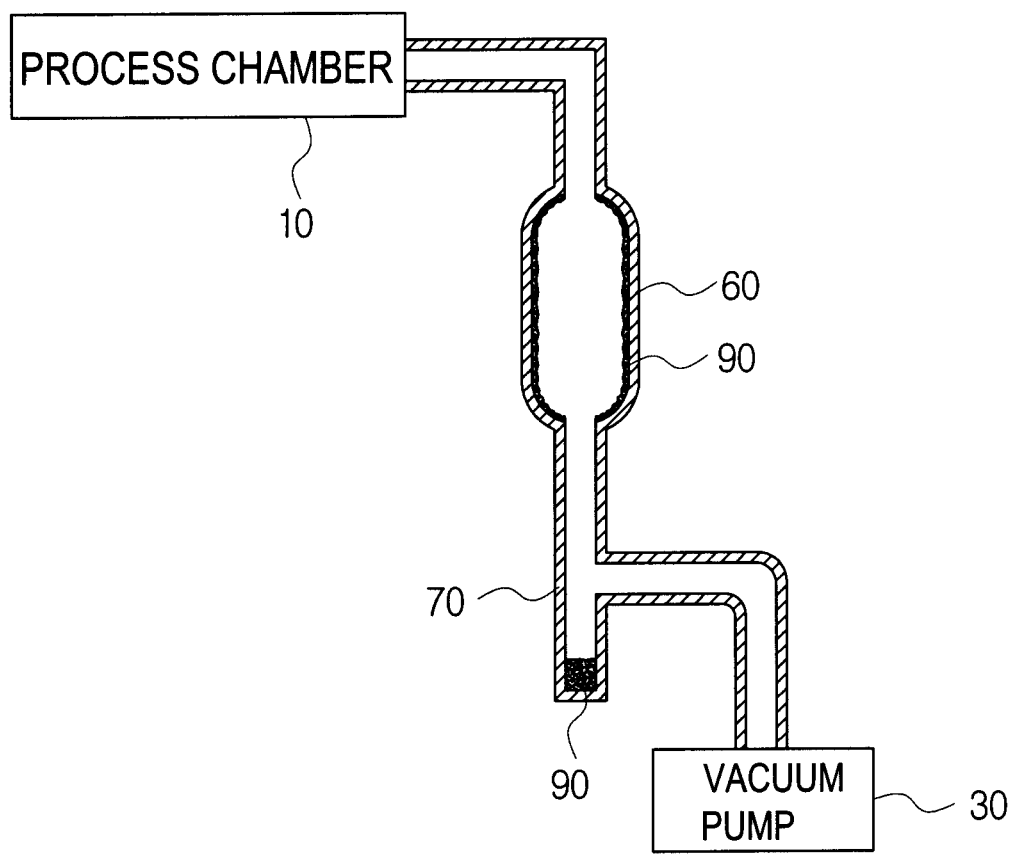
FIG. 1 is a reference view for describing a collection device according to the related art.

A cobalt-carbon gas collection apparatus according to embodiments of the present disclosure will be described in detail with reference to the accompanying drawings. Since the present disclosure may apply various changes and have various forms, specific embodiments will be illustrated in the drawings and described in detail in the text. However, it should be understood that the present disclosure is not limited to the specific embodiments and includes all changes, equivalents, and substitutes included in the spirit and scope of the present disclosure. In description of each drawing, similar reference numerals are used for similar components. In the accompanying drawings, the dimensions of structures are illustrated to be larger than the actual sizes for clarity of the present disclosure or to be smaller than the actual sizes to understand a schematic configuration.

Further, terms such as first and second may be used to describe various components, but the components should not be limited to the terms. The terms are used only for the purpose of distinguishing one component from another component. For example, without departing from the scope of the present disclosure, a first component may be referred to as a second component, and similarly, the second component may be referred to as the first component. Meanwhile, unless otherwise defined, all terms used herein including technical or scientific terms have the same meanings as those commonly understood by those skilled in the art to which the present disclosure belongs. Terms defined in commonly used dictionaries should be interpreted as having the same meanings in the context of the related art and may not be interpreted with ideal or excessively formal meanings, unless explicitly defined in the present application.

Embodiment

Figure 2:
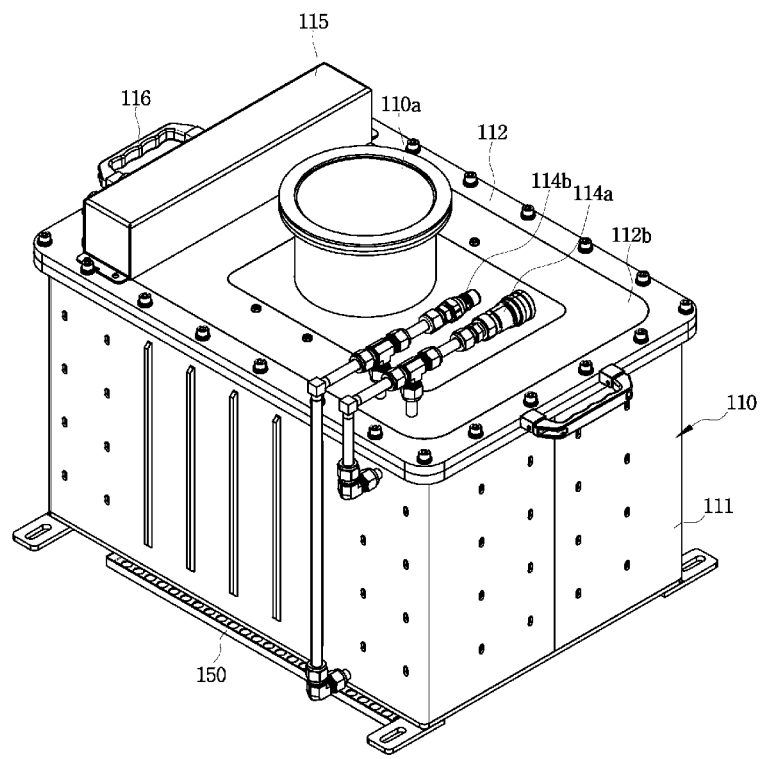
FIG. 2 is a perspective view of a cobalt-carbon gas collection apparatus according to an embodiment of the present disclosure.
Figure 3:
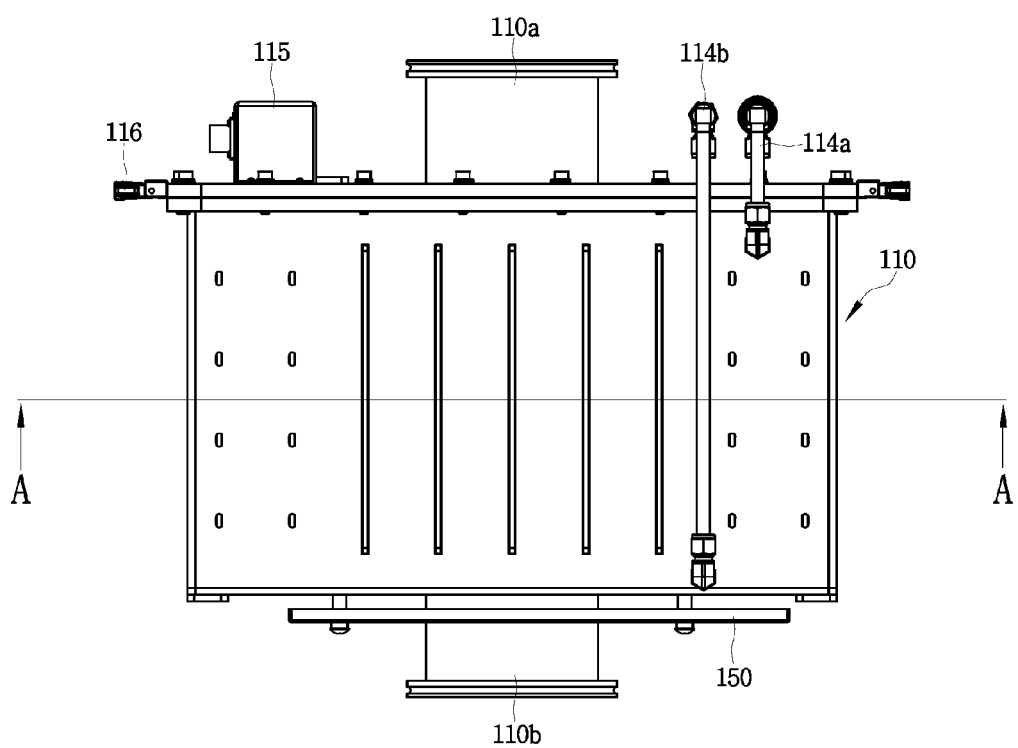
FIG. 3 is a front view of the cobalt-carbon gas collection apparatus according to the embodiment of the present disclosure.
Figure 4:
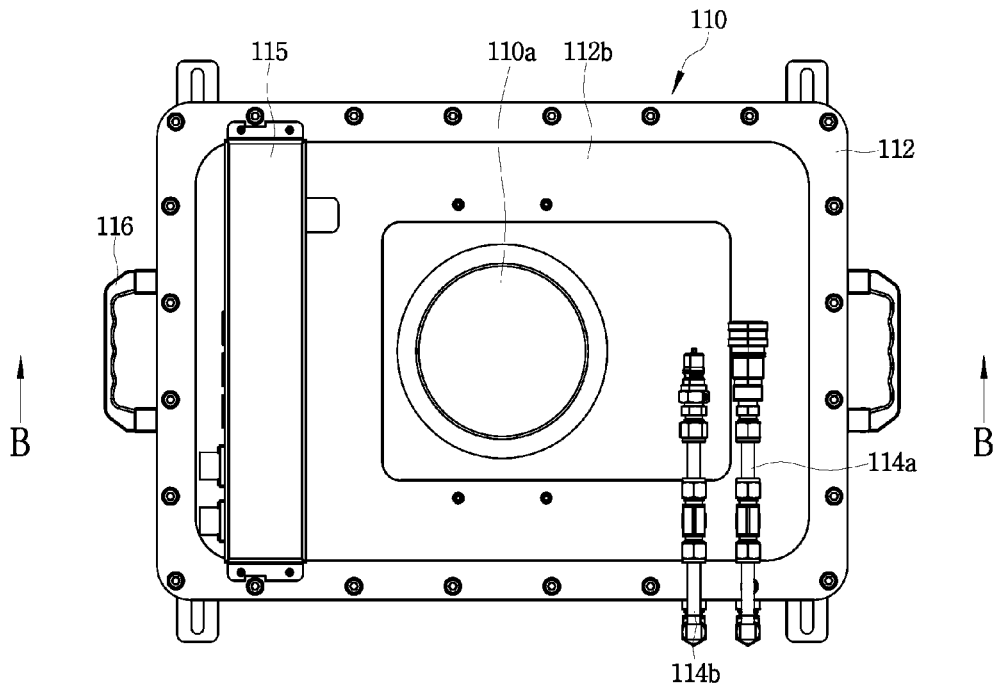
FIG. 4 is a plan view of the cobalt-carbon gas collection apparatus according to the embodiment of the present disclosure.
Figure 5:
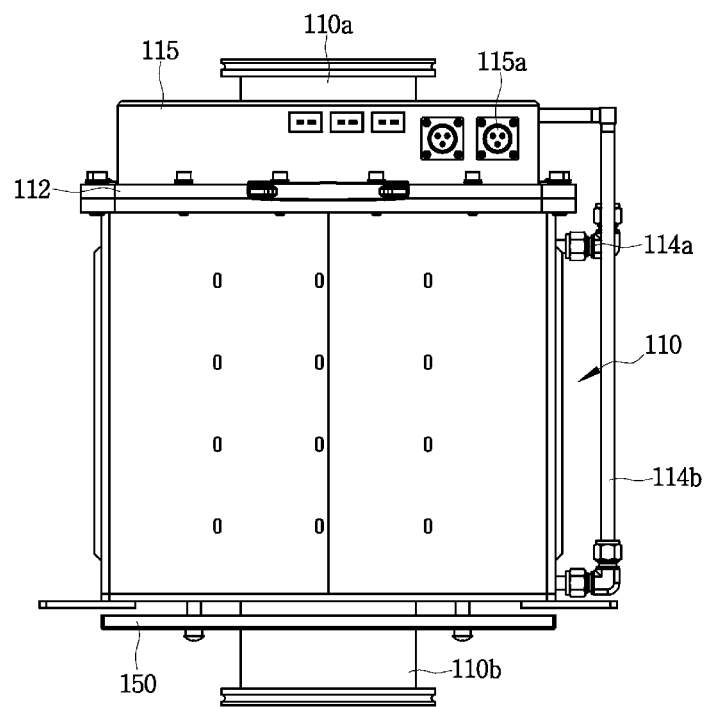
FIG. 5 is a side view of the cobalt-carbon gas collection apparatus according to the embodiment of the present disclosure.
Figure 6:
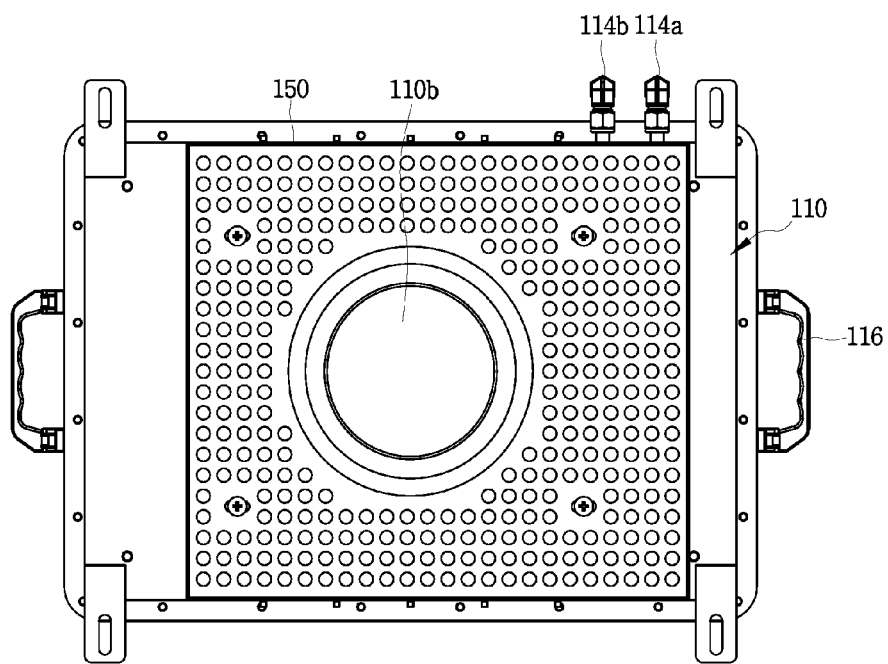
FIG. 6 is a bottom view of the cobalt-carbon gas collection apparatus according to the embodiment of the present disclosure.
Figure 7:
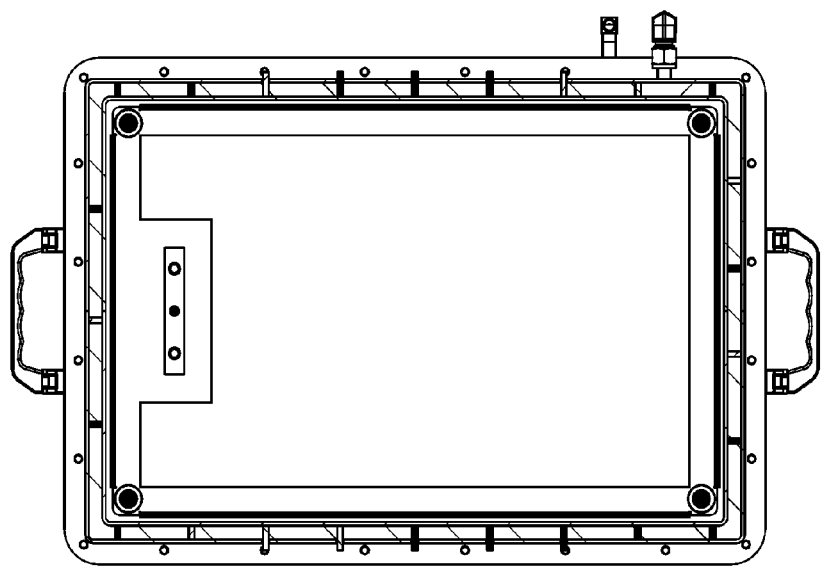
FIG. 7 is a sectional view taken along line A-A of FIG. 3.
Figure 8:
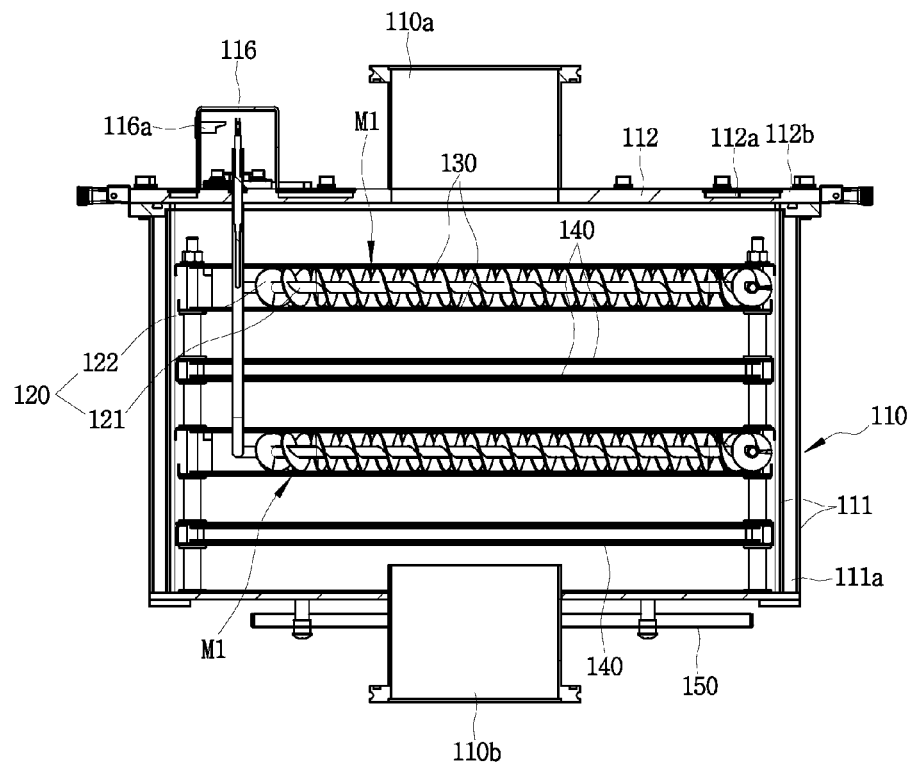
FIG. 8 is a sectional view taken along line B-B of FIG. 4.
Figure 9:
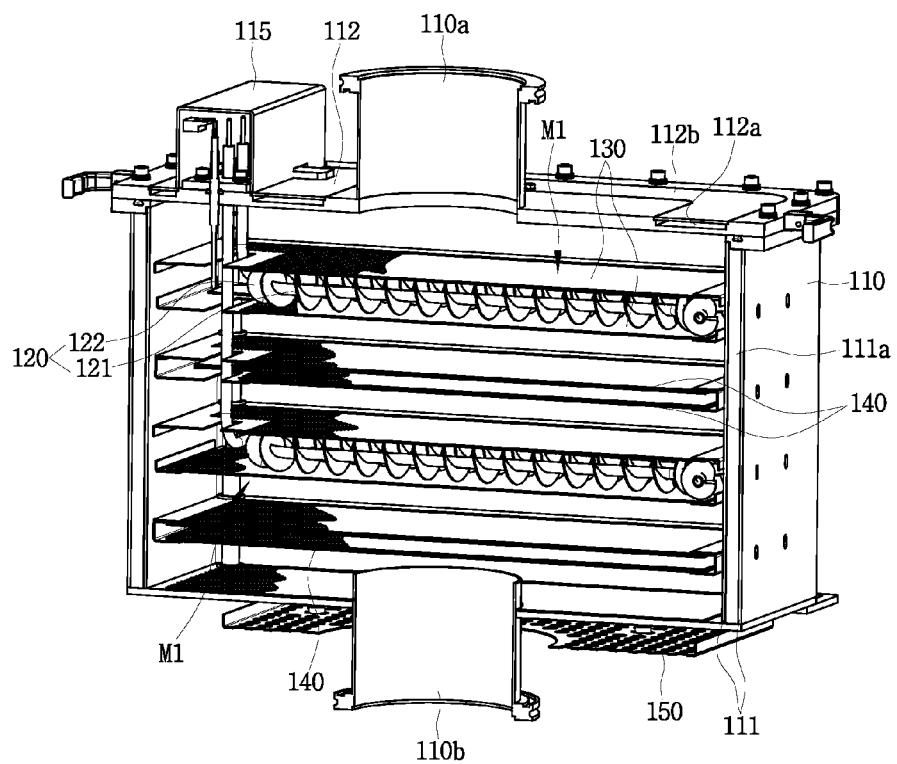
FIG. 9 is a sectional perspective view for describing an internal configuration of the cobalt-carbon gas collection apparatus according to the embodiment of the present disclosure.
Figure 10:
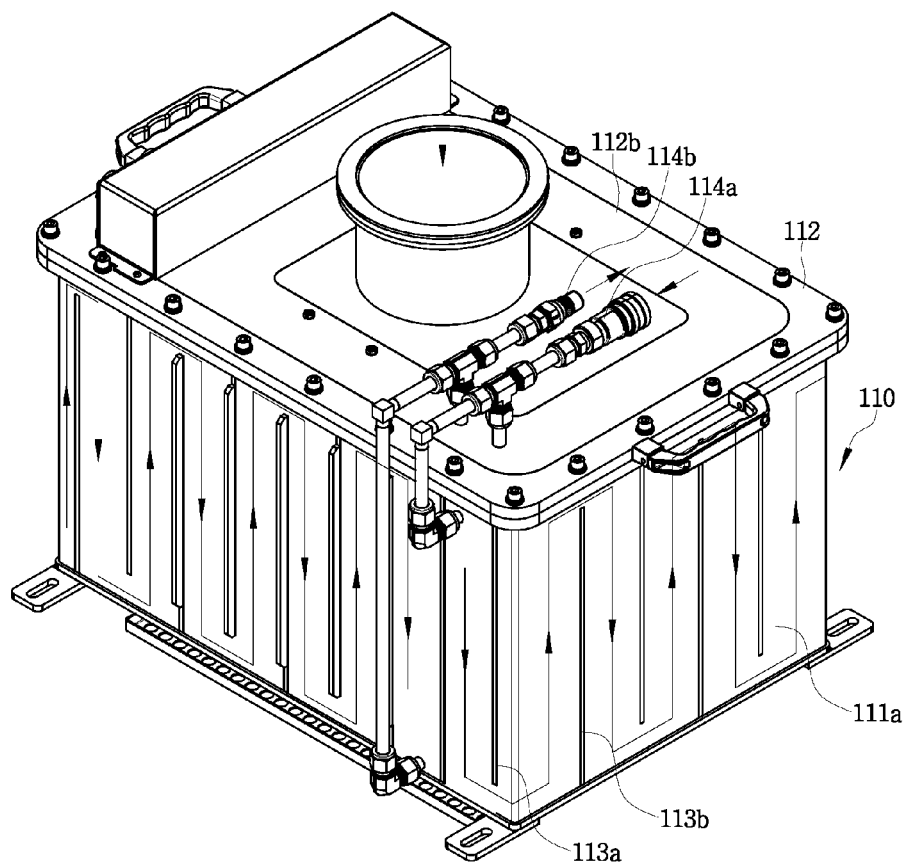
FIG. 10 is a reference view illustrating an internal configuration of a wall part from which an outer panel of a housing wall part is removed in the cobalt-carbon gas collection device according to the embodiment of the present disclosure.

FIG. 2 is a perspective view of a cobalt-carbon gas collection apparatus according to an embodiment of the present disclosure, FIG. 3 is a front view of the cobalt-carbon gas collection apparatus according to the embodiment of the present disclosure, FIG. 4 is a plan view of the cobalt-carbon gas collection apparatus according to the embodiment of the present disclosure, FIG. 5 is a side view of the cobalt-carbon gas collection apparatus according to the embodiment of the present disclosure, FIG. 6 is a bottom view of the cobalt-carbon gas collection apparatus according to the embodiment of the present disclosure, FIG. 7 is a sectional view taken along line A-A of FIG. 3, FIG. 8 is a sectional view taken along line B-B of FIG. 4, FIG. 9 is a sectional perspective view for describing an internal configuration of the cobalt-carbon gas collection apparatus according to the embodiment of the present disclosure, and FIG. 10 is a reference view illustrating an internal configuration of a wall part from which an outer panel of a housing wall part is removed in the cobalt-carbon gas collection device according to the embodiment of the present disclosure.

As illustrated, the cobalt-carbon gas collection apparatus according to the embodiment of the present disclosure includes a housing 110, a heating member 120, a cobalt deposition member 130, an auxiliary deposition member 140, and cooling members 114a and 114b.

In the cobalt-carbon gas collection apparatus according to the embodiment of the present disclosure, the heating member 120 heats the inside of a chamber of the housing 110 to separate a cobalt-carbon gas introduced into the chamber into a cobalt composite and a carbon composite, the cobalt composite and the carbon composite, which are separated, are individually deposited on the inner surfaces of the cobalt deposition member 130 and the cooled housing 110, and thus the cobalt-carbon gas may be effectively collected.

Hereinafter, the cobalt-carbon gas collection apparatus according to the embodiment of the present disclosure will be described in detail with reference to the respective components.

The housing 110 has the chamber formed therein and having a large space, an inlet 110a which is formed in an upper portion thereof and through which the cobalt-carbon gas is introduced, and an outlet 110b which is formed in a lower portion thereof and through which the remainder remaining after the cobalt-carbon gas is deposited inside the chamber flows out. A wall part 111 of the housing 110 is formed in a double wall structure having a separation space 111a therein such that cooling water may be injected and flow into the wall part 111.

As illustrated in FIG. 10, a plurality of first guide partitions 113a and a plurality of second guide partitions 113b, which are vertically formed, are alternately installed in the separation space 111a in a circumferential direction of the housing 110. The first guide partitions 113a are installed inclined upward in the separation space 111a to allow the cooling water to flow downward, and the second guide partitions 113b are installed inclined downward to allow the cooling water to flow upward. Accordingly, the cooling water flows in the circumferential direction of the housing 110 in a zigzag manner in the separation space 111a inside the wall part 111 of the housing 110.

Meanwhile, the upper surface of the housing 110 is formed as an upper cover 112 to be openable or closable. Here, in the upper cover 112, a cooling water circulation hole 112a is formed such that the cooling water is injected into the upper cover 112, circulates in the circumferential direction, and is then discharged, and an auxiliary cover 112b covers the upper side thereof. As illustrated in FIGS. 2 and 10, the cooling water flowing in the separation space 111a formed inside the wall part 111 of the housing 110 and the cooling water circulation hole 112a of the upper cover 112, which are connected through a branched cooling water injection tube 114a, is simultaneously supplied thereto, and the cooling water is simultaneously discharged therefrom through a branched cooling water discharge tube 114b.

In this way, the housing 110 includes the separation space 111a that allows the cooling water to flow in a state in which the cooling water is filled in the entire interior of the wall part 111 and the cooling water circulation hole 112a that allows the cooling water to flow up to the upper cover 112. Accordingly, the inner surface of the housing 110 may be very effectively cooled using fresh cooling water having a temperature of about 15° C. Accordingly, while moving in a high-temperature atmosphere inside the chamber set to a temperature of about 250° C., the carbon composite separated from the cobalt composite in the chamber of the housing 110 may not be deposited on the surface of the cobalt deposition member 130 or the auxiliary deposition member 140 having a surface temperature higher than or similar to the set temperature. Then, as soon as the carbon composite comes into contact with the inner surface of the housing 110 cooled to a temperature less than 60° C. by the cooling water, the carbon composite is rapidly cooled, solidified, and deposited.

A pair of handles 116 are installed on the left and right sides of the upper cover 112 of the housing 110 so that a user may simply transport the housing 110 while holding the handles 116, and a metallic perforated plate 150 coupled to be spaced apart from the bottom surface of the housing 110 is further installed below the housing 110. The metallic perforated plate 150 protects an indoor floor from damage by preventing the bottom surface of the housing 110 from being in direct contact with the floor. As illustrated in the drawing, according to the configuration in which the housing 110 is formed in a tetragonal box shape, has the handles 116, and additionally has the metallic perforated plate 150 further installed therebelow, it can be seen that the cobalt-carbon gas collection apparatus according to the embodiment of the present disclosure is optimized to be very simply transported and installed.

The heating member 120 is installed in the housing 110 to receive electric power to generate heat, increases the temperature inside the chamber of the housing 110 to heat the cobalt-carbon gas introduced into the chamber of the housing 110 to a temperature higher than the temperature immediately after the introduction into the chamber and serves to induce the cobalt-carbon gas to be separated into the cobalt composite and the carbon composite. Here, the heating temperature of the heating member 120 should be at a level at which cobalt-carbon gas particles having a structure in which the carbon composite surrounds the cobalt composite reach a temperature at which the cobalt composite is heated and expanded. When the cobalt composites are heated and expanded, the carbon composite surrounding the cobalt composite is actively separated, and thus the carbon composite and the cobalt composite become a state capable of being effectively deposited by simply applying appropriate conditions to the carbon composite and the cobalt composite. For reference, in the case of the cobalt-carbon gas generated when a semiconductor is manufactured by the parent company requested by the present applicant, the cobalt-carbon gas particles start to be actively separated into the cobalt composite and the carbon composite at about 235° C. Thus, the internal temperature of the chamber of the housing 110 is set to increase to about 250° C. by the heat generated by the heating member 120. Accordingly, when the cobalt-carbon gas having a temperature of about 100° C. is introduced into the chamber of the housing 100 maintaining an internal temperature of 250° C., the cobalt composite and the carbon composite are actively separated. However, since the composition of the cobalt composite and the carbon composite constituting the cobalt-carbon gas is not constant for each manufacturer, a temperature required for actively separating the cobalt-carbon gas particles into the cobalt composite and the carbon composite and a set temperature of the chamber of the housing vary according thereto, and appropriate temperatures may be determined through repeated experiments. What is important is that the temperature inside the chamber of the housing 110 by the heating member 120 should be set to a temperature for inducing the cobalt-carbon gas to be actively separated into the cobalt composite and the carbon composite.

Here, the heating member 120 includes a line-type heater 121 installed in a line shape along the cobalt deposition member 130 and surface-shaped heating contact fins 122 installed in a wing shape along the outer circumferential surface of the line-type heater 121. The heating contact fins 122 serve to increase a surface area that is insufficient only by the line-type heater 121. In this way, when the surface area is increased to a sufficient level by the heating contact fins 122, the inside of the chamber of the housing 110 and the cobalt deposition member 130 installed near the chamber may be heated more quickly. Furthermore, the heating contact fins 122 also function to deposit the cobalt composite by making surface contact with the cobalt composite. It may be noted that the heating contact fins 122 are not simply installed in a form in which a plurality of discs are successively arranged along the line-type heater 121 but in a form (like, tornado potato chips) of being successively wound in a spiral shape along the outer peripheral surface of the line-type heater 121 as illustrated in FIGS. 8 and 9. In this way, when the heating contact fins 122 are installed to be successively wound in a spiral shape, since the heating contact fins 122 are formed with an obliquely inclined surface rather than a vertical surface, more intense contact is made with the cobalt composite mainly moving from the top to the bottom, and thus deposition efficiency is also increased. A power box 115 is installed on the upper cover 112 of the housing 110 to apply power to the line-type heater 121 of the heating member 120, and the power box 115 has a power terminal 115a for plugging in a power plug for applying power.

The cobalt deposition member 130 is installed across the chamber of the housing 110 and serves to oxidize and deposit the cobalt composite while coming into surface contact with the cobalt composite while being heated by the heating member 120. To this end, the cobalt deposition member 130 is provided as a metal lath which is a plate having a mesh shape such that the cobalt composite and the carbon composite come into surface contact with the cobalt deposition member 130 while passing from the top to the bottom. Here, as illustrated in FIGS. 8 and 9, a plurality of cobalt deposition members 130 are arranged adjacent to each other and vertically spaced apart from each other, heating members 120 are installed in the spaced parts, and thus the cobalt deposition members 130 and the heating members 120 are integrated into a module M1. Accordingly, the cobalt deposition member 130 may be directly heated in the vicinity of the heating member 120. The cobalt deposition members 130 should be heated to a temperature higher than the temperature inside the chamber of the housing 110 to oxidize and deposit the cobalt composite, and in this way, separate temperature control or an additional configuration is not required through an arrangement method in which the cobalt deposition members 130 are installed adjacent to the upper side and the lower side based on the heating member 120.

The auxiliary deposition member 140 is installed across the chamber of the housing 110 at a point spaced toward the lower side of the cobalt deposition member 130 and serves to oxidize and deposit the cobalt composite, which passes through the cobalt deposition member 130 without being deposited on the cobalt deposition member 130, while coming into surface contact with the cobalt composite. Like the cobalt deposition member 130, the auxiliary deposition member 140 is provided in a form in which metal laths, which are plates having a mesh shape, are vertically spaced apart from each other such that the cobalt composite and the carbon composite come into surface contact with the auxiliary deposition member 140 while passing from the top to the bottom. However, as illustrated in FIGS. 8 and 9, a separation distance between the metal laths of the auxiliary deposition member 140 is narrower than a separation distance between the metal laths of the cobalt deposition member 130. Further, it is preferable that the auxiliary deposition member 140 is formed in a more dense mesh shape than the cobalt deposition member 130 to increase the contact density with respect to the cobalt composite to more than that of the cobalt deposition member 130, thereby achieving differentiation. The auxiliary deposition member 140 installed in this way is differentiated from the cobalt deposition member 130, is heated to have a lower surface temperature than the cobalt deposition member 130, and comes into contact with the cobalt composite, and two auxiliary deposition members 140 are densely arranged at a narrow interval. Thus, the cobalt composite, which is not deposited on the cobalt deposition member 130, are advantageously deposited more thoroughly through such a differentiated configuration. The plurality of cobalt deposition members 130 and the plurality of auxiliary deposition members 140 are alternately installed in the chamber of the housing 110 to increase the collection amount of the cobalt composite.

The cooling members 114a and 114b lower the temperature of the inner surface of the housing 110 to a temperature less than a predetermined temperature while cooling the wall part 111 of the housing 110 and thus induce solidification and deposition of the carbon composite coming into contact with the inner surface of the housing 110. As illustrated in FIGS. 2 and 10, the cooling members 114a and 114b are provided as the cooling water injection tube 114a and the cooling water discharge tube 114b that cause the cooling water to circulate to the separation space 111a of the wall part 111 of the housing 110. Here, the cooling water injection tube 114a is connected to a cooling water tank, in which the cooling water is stored, and diverges and injects the fresh cooling water supplied from the cooling water tank into the separation space 111a of the wall part 111 of the housing 110 and the cooling water circulation hole 112a of the upper cover 112. It is obvious that the cooling water injection tube 114a may be directly connected to a water supply rather than the cooling water tank to receive the cooling water. In this way, it may be noted that the cobalt-carbon gas collection apparatus according to the embodiment of the present disclosure is made to have a sufficient area and a temperature condition for depositing the carbon composite by rapidly cooling the carbon composite over almost the entire inner surface of the housing 110, through only a simple configuration in which the separation space 111a and the cooling water circulation hole 112a are provided in the wall part 111 and the upper cover 112 of the housing 110 and the cooling water injection tube 114a and the cooling water discharge tube 114b for injecting and discharging the cooling water are provided. Here, in order to build the same conditions for depositing the carbon composite on the inner surface of the housing 110, a configuration in which Peltier elements are successively installed on the wall part 111 of the housing 110 could be considered. However, there is a disadvantage in that when the Peltier element is used, a uniform temperature is not easily formed throughout the wall part 111 by cooling the wall part 111 of the housing 110 only with inexpensive installation and maintenance.

In this way, by using the cobalt-carbon gas collection apparatus according to the present disclosure, the cobalt-carbon gas is separated into the cobalt composite and the carbon composite, then the separated cobalt composite and carbon composite are separately deposited, and thus more effective collection can be achieved. According to the present applicant's own comparative experiment, as compared to a case where the cobalt-carbon gas is deposited without change by a collection apparatus according to the related art, encouraging results that more than twice the collection amount was possible might be obtained using the method of separating the cobalt-carbon gas into the cobalt composite and the carbon composite, and then separately depositing the separated cobalt composite and carbon composite.

The cobalt-carbon gas collection apparatus according to the present disclosure separates the cobalt-carbon gas into the cobalt composite and the carbon composite, the cobalt composite and carbon composite, which are separated, are individually deposited, and thus more effective collection can be achieved.

Although the exemplary embodiments of the present disclosure have been described above, the present disclosure may use various changes, modifications, and equivalents. It is apparent that the present disclosure can be equally applied by appropriately modifying the above embodiments. Therefore, the above description does not limit the scope of the present disclosure determined by the limit of the appended claims.

What is claimed is:

1. A cobalt-carbon gas collection apparatus that collects a cobalt-carbon gas generated in a metal process performed when any one product included in a product group including a semiconductor product is manufactured, the apparatus comprising:
   a housing that has a chamber formed therein and an inlet port and an outlet port communicating with the chamber;
   a heating member that is installed in the housing, increases a temperature inside the chamber of the housing to heat the cobalt-carbon gas introduced into the chamber of the housing to a temperature higher than a temperature immediately after the introduction into the chamber, and induces the cobalt-carbon gas to be separated into a cobalt composite and a carbon composite;
   a cobalt deposition member that is installed across the chamber of the housing and oxidizes and deposits the cobalt composite while coming into surface contact with the cobalt composite while being heated by the heating member; and
   a cooling member that induces the carbon composite to be solidified and deposited while rapidly cooling the carbon composite in contact with an inner surface of the housing by cooling a wall part of the housing,
   wherein an inside of the chamber of the housing is heated by the heating member, the cobalt-carbon gas introduced into the chamber is separated into the cobalt composite and the carbon composite, and the cobalt composite and the carbon composite, which are separated, are individually deposited on the heated cobalt deposition member and the cooled inner surface of the housing.

2. The cobalt-carbon gas collection apparatus of claim 1, wherein:
   the heating member induces the carbon composite to be separated from the cobalt composite by heating cobalt-carbon gas particles having a structure in which the carbon composite surrounds the cobalt composite to a temperature at which the cobalt composite is heated and expanded;
   the cobalt deposition member is heated to a temperature higher than the temperature inside the chamber of the housing in order to oxide and deposit the cobalt composite; and
   the inner surface of the housing is cooled to a temperature sharply lower than a temperature of the cobalt-carbon gas immediately after the cobalt-carbon gas is introduced into the chamber of the housing in order to induce solidification and deposition of the carbon composite.

3. The cobalt-carbon gas collection apparatus of claim 1, wherein the cobalt deposition member is provided as a metal lath that is a plate having a mesh shape such that the cobalt composite and the carbon composite come into surface contact therewith while passing from a top to a bottom.

4. The cobalt-carbon gas collection apparatus of claim 3, wherein the cobalt deposition member is provided as a plurality of cobalt deposition members arranged adjacent to and vertically spaced apart from each other, the heating member is installed between the plurality of cobalt deposition members, and thus the cobalt deposition members are heated in a vicinity of the heating members.

5. The cobalt-carbon gas collection apparatus of claim 4, wherein the heater includes:
- a line-type heater installed in a line shape along the cobalt deposition member; and
- heating contact fins installed in a wing shape along an outer circumferential surface of the line-type heater and configured to increase a heating contact area for the cobalt composite.

6. The cobalt-carbon gas collection apparatus of claim 5, wherein the heating contact fins are successively wound and installed in a spiral shape along an outer peripheral surface of the line-type heater.

7. The cobalt-carbon gas collection apparatus of claim 4, further comprising an auxiliary deposition member that is installed across the chamber of the housing at a point spaced apart from a lower side of the cobalt deposition member and oxidizes and deposits the cobalt composite, which passes through the cobalt deposition member without being deposited on the cobalt deposition member, while coming into surface contact with the cobalt composite,
- wherein the auxiliary deposition member is provided as a metal lath that is a plate having a mesh shape such that the cobalt composite and the carbon composite come into contact with the auxiliary deposition member while passing from the top to the bottom, and the auxiliary deposition member is provided as a plurality of auxiliary deposition members arranged adjacent to and spaced apart from each other, densely arranged at an interval narrower than an interval of the cobalt deposition members, and heated to a surface temperature lower than a surface temperature of the cobalt deposition member.

8. The cobalt-carbon gas collection apparatus of claim 7, wherein the plurality of cobalt deposition members and the plurality of auxiliary deposition members are alternately installed in the chamber of the housing.

9. The cobalt-carbon gas collection apparatus of claim 8, wherein an outlet tube installed at the outlet port prevents the cobalt composite and the carbon composite that are not deposited from flowing out from the chamber of the housing by causing an upper end of the outlet tube to protrude upward from a bottom of the chamber of the housing.

10. The cobalt-carbon gas collection apparatus of claim 1, wherein:
- the wall part of the housing is formed in a double wall structure having a separation space therein; and
- the cooling member is a cooling water injection tube and a cooling water discharge tube that cause cooling water to circulate to the separation space of the wall part of the housing.

11. The cobalt-carbon gas collection apparatus of claim 10, wherein a plurality of first guide partitions and a plurality of second guide partitions, which are vertically formed, are alternately installed in the separation space formed inside the wall part of the housing in a circumferential direction of the housing, the first guide partitions are provided to be biased upward to allow the cooling water to flow downward, the second guide partitions are provided to be biased downward to allow the cooling water to flow upward, and thus the cooling water is guided to flow in the circumferential direction of the housing in a zigzag manner in the separation space inside the wall part of the housing.

12. The cobalt-carbon gas collection apparatus of claim 10, wherein an upper surface of the housing is formed as an upper cover to be opened or closed, a cooling water circulation hole in which the cooling water is injected by the cooling water injection tube, circulates in a circumferential direction, and is then discharged along the cooling water discharge tube is formed inside the upper cover, and thus the deposition of the carbon composite in contact with a lower surface of the upper cover is induced.

13. A cobalt-carbon gas collection method that collects a cobalt-carbon gas generated in a metal process performed when any one product included in a product group including a semiconductor product is manufactured, the method comprising:
- separating the cobalt-carbon gas, which is introduced into a chamber, into a cobalt composite and a carbon composite first by heating an inside of the sealed chamber; and
- individually depositing the cobalt composite and the carbon composite which are separated.

14. The cobalt-carbon gas collection method of claim 13, wherein the cobalt composite surrounded by the carbon composite is heated and expanded to separate the cobalt-carbon gas into the cobalt composite and the carbon composite in the chamber.

15. The cobalt-carbon gas collection method of claim 13, wherein:
- the separated cobalt composite is oxidized and deposited by being in contact with a surface of a cobalt deposition member heated to a temperature higher than a temperature inside the chamber; and
- the separated carbon composite is rapidly cooled to be solidified and deposited by being in contact with a surface of another member cooled to a temperature lower than a temperature of the cobalt-carbon gas introduced into the chamber.

* * * * *